(12) United States Patent
Zheng et al.

(10) Patent No.: US 8,259,847 B2
(45) Date of Patent: Sep. 4, 2012

(54) EXTENDED NON-RETURN-TO-ZERO SERIAL CHANNEL SIGNALING

(75) Inventors: Yi Zheng, Cold Spring, MN (US); Joel R. Goergen, Maple Grove, MN (US)

(73) Assignee: Force10 Networks, Inc., San Jose, CA (US)

( * ) Notice: Subject to any disclaimer, the term of this patent is extended or adjusted under 35 U.S.C. 154(b) by 0 days.

(21) Appl. No.: 13/272,329

(22) Filed: Oct. 13, 2011

(65) Prior Publication Data

US 2012/0033760 A1    Feb. 9, 2012

Related U.S. Application Data

(62) Division of application No. 12/077,615, filed on Mar. 20, 2008, now Pat. No. 8,121,205.

(51) Int. Cl.
*H04K 1/02* (2006.01)
*H04L 27/00* (2006.01)

(52) U.S. Cl. .................................. 375/296; 375/295

(58) Field of Classification Search .................. 375/296, 375/295
See application file for complete search history.

(56) References Cited

U.S. PATENT DOCUMENTS 5,640,210 A * 6/1997 Knee et al. .................... 348/469

\* cited by examiner

*Primary Examiner* — David C. Payne
*Assistant Examiner* — Brian J Stevens
(74) *Attorney, Agent, or Firm* — Haynes & Boone, LLP

(57) ABSTRACT

Methods and apparatus for serial channel operation are disclosed. An N+1-level signaling scheme is used to transmit N staggered but overlapping NRZ sub-sequences concurrently on a serial channel. Each sequence has a bit rate R and an essential bandwidth of R Hz. The combined bit rate of the channel is N×R, but due to a lack of correlation between the sub-sequences, the essential bandwidth remains approximately R Hz. The signaling scheme also contains redundancy that allows some errors to be detected and/or corrected. Other embodiments are also described and claimed.

9 Claims, 9 Drawing Sheets

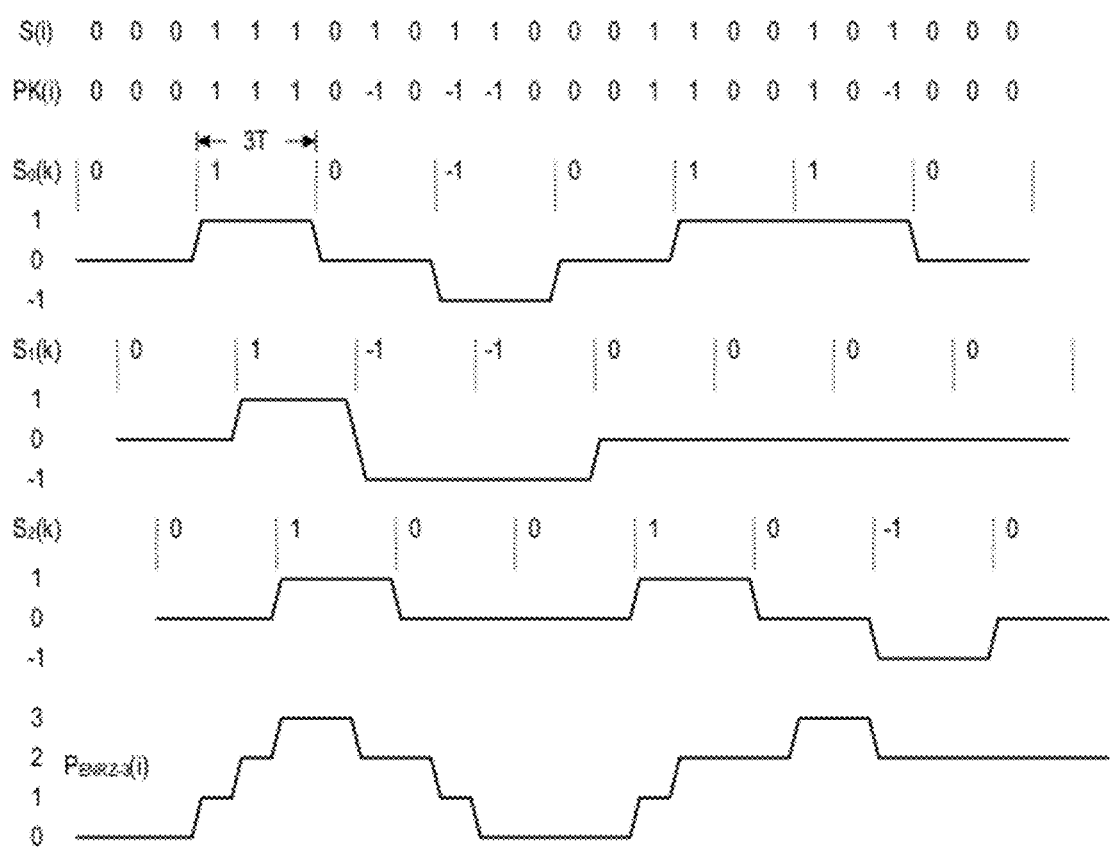

EXTENDED NON-RETURN-TO-ZERO SERIAL CHANNEL SIGNALING

CROSS-REFERENCE TO RELATED APPLICATIONS

The application claims priority to and is a divisional of co-owned, U.S. patent application Ser. No. 12/077,615, filed Mar. 20, 2008 now U.S. Pat. No. 8,121,205 by Yi Zheng, entitled EXTENDED NON-RETURN-TO-ZERO SERIAL CHANNEL SIGNALING, which is incorporated herein by reference in its entirety.

BACKGROUND

1. Field of the Invention

The present disclosure relates generally to serial channel coding, and more particularly to techniques for transmitting and receiving a data sequence across an electrical serial channel.

2. Description of Related Art

For purposes of this disclosure, a serial channel in an electronic system comprises a signal path between a transmitter that transmits a single data stream containing all information necessary to receive the data stream and a receiver that receives the data stream. A typical serial channel transmitter transmits a series of equally-spaced symbols at a given symbol rate R. The receiver recovers the symbol rate and symbol timing from the received data, and uses the recovered timing to detect, for each symbol period, which symbol was transmitted.

A serial channel code determines the symbol sequence that will be transferred across a channel to represent a given data sequence. Serial channel codes require at least two symbols, although some codes use many more symbols. One typical method of transmission assigns a pulse of a given voltage level to each symbol. For high-speed transmission, the channel does not return to a quiescent level between successive symbols—this is known as Non-Return-to-Zero (NRZ) signaling.

FIG. 1A illustrates, for an exemplary binary input data stream S(i), binary channel coding using Pulse Amplitude Modulation (PAM). When S(i)=0, a first symbol amplitude S1 that represents "0" is transmitted, and when S(i)=1, a second symbol amplitude S2 that represents "1" is transmitted. Each symbol has a period T, where T=1/R. When either S1 or S2 is transmitted by sending no signal, this is known as "on-off" signaling. When S1=−S2, this is known as polar signaling. Other symbol choices can result in an offset polar signal that has a DC bias VB, i.e., where S1=2×VB−S2. Any of these signal types can also be transmitted differentially using two conductors, where a 0 is transmitted by sending S1 on the first conductor and sending S2 on the second conductor at the same time, and a 1 is transmitted by sending S2 on the first conductor and sending S1 on the second conductor at the same time.

Pulse Amplitude Modulation can use more than two symbol amplitudes. FIG. 1B shows an example for S(i) and PAM4 (four-level PAM) coding, and FIG. 1C shows an example for S(i) and PAM8 (eight-level PAM) coding. Turning first to PAM4 and FIG. 1B, with four signal levels available, each symbol can transmit two bits of information. One of the four signal levels is assigned to each of the possible two-bit patterns "00," "01," "10," and "11." S(i) is then transmitted two bits at a time, with each symbol having a period 2T, e.g., 2/R.

With the FIG. 1C eight-level coding, each PAM8 symbol can transmit three bits of information. One of the eight signal levels is assigned to each of the possible three-bit patterns shown in FIG. 1C. S(i) is then transmitted three bits at a time, with each symbol having a period 3T, e.g., 3/R. PAM4 and PAM8 can both be transmitted as polar signals or offset polar symbols.

The bandwidth required to transmit a PAM signal is proportional to the symbol rate. For instance, FIG. 2 shows a measured power spectral density (distribution of the transmitted signal power as a function of frequency) for NRZ polar signaling with a symbol rate R=2 Gbps (billion bits/second). The bulk of the transmitted power is concentrated in a main lobe between 0 Hz and 2 GHz. Additional sidelobes exist, with the first sidelobe peaking at about −12 dB around 3 GHz, the second sidelobe peaking at about −14 dB around 5 GHz, etc. (the waveform in this example was sampled at 10 GHz, and thus frequencies beyond 5 GHz are not shown).

The essential bandwidth necessary to transmit the FIG. 2 signal is approximately equal to the main lobe width, e.g., 2 GHz. In other words, should the channel attenuate the higher frequencies more than the main lobe frequencies, it should be possible to reliably receive the signal when noise power is controlled.

The primary advantage of PAM4 and PAM8 is a lower symbol rate, resulting in a proportionally narrower main lobe width, e.g., 1 GHz for PAM4 and 0.67 GHz for PAM8. Thus a channel that may be marginal for NRZ polar at 2 Gbps could perform well for 2 Gbps PAM4, with a 1 Gbps symbol rate, and even better for 2 Gbps PAM8, with a 0.67 Gbps symbol rate. One tradeoff, however, is that when the same symbol spacing used for NRZ is maintained, PAM4 and PAM8 require much more power. Another tradeoff is that the number of signaling levels (and thus transmitter and receiver complexity) increase as $2^N$, wherein N is the number of bits transmitted per symbol. Thus one quickly reaches a point of diminishing returns—the 25% bandwidth decrease available from going from PAM8 (3 bits/symbol) to PAM16 (4 bits/symbol), for example, requires 16 signal levels instead of 8.

BRIEF DESCRIPTION OF THE DRAWINGS

The present invention can be best understood by reading the specification with reference to the following Figures, in which:

FIG. 13 shows a coding example for an alternate embodiment employing pre-coding.

DETAILED DESCRIPTION

As integrated circuit data rates increase, the reliable transport of data between integrated circuits across a serial channel becomes more difficult. Higher data rates have heretofore required higher symbol rates and/or geometrically increasing symbol levels. Higher symbol rates (and the accompanying higher frequencies required) create additional signal loss across the channel, partially manifest as undesirable crosstalk signals appearing on neighboring channels. Additional signal levels either create more crosstalk energy (assuming a fixed minimum signal level spacing and therefore more power) or require better signal-to-noise ratio (SNR) at the receiver. In all such cases, the design and operation of electrical serial channels reach a point where each of the traditional solutions becomes impractical.

An alternate coding scheme that can allow significant decreases in serial channel bandwidth/symbol has now been discovered. This coding scheme is referred to herein as Extended NRZ-N (ENRZ-N) signaling or coding. With ENRZ-N coding, a data stream with a symbol rate of NR is divided into N data sub-streams, each with a symbol rate R. The individual sub-streams are time-shifted with respect to each other (with sub-stream spacing of 1/NR) and transmitted over the same channel concurrently as N time-shifted NRZ pulse sequences. Each sub-stream has an essential bandwidth of R Hz, and because the sub-streams are uncorrelated, the PSD of the combined sequences resembles the PSD of one sequence. Thus the combined data rate realized on the serial channel is NR.

Unlike PAM modulation techniques, which require $2^N$ signaling levels to transmit N-bit symbols, the number of signaling levels required for ENRZ-N is linearly proportional to N (a total of N+1 signaling levels for N sub-streams). Thus ENRZ-3 requires four signal levels, like PAM4, but for a given symbol rate R requires an essential bandwidth of R/3 instead of R/2 for PAM4. ENRZ-4 requires five signal levels, and requires an essential bandwidth of R/4 under similar circumstances. The described methods and hardware can be extended to higher values of N, if so desired.

Another advantage as compared to PAM coding lies in the ability of ENRZ-N to detect, and in some cases correct, transmission errors. This capability is due to the coding quality that, given correct decoding of the preceding N−1 bits, the next received symbol is known to take one of only two possible levels from the N+1 total levels. Other characteristics and advantages that can be realized with embodiments are described below.

Figure 3A:
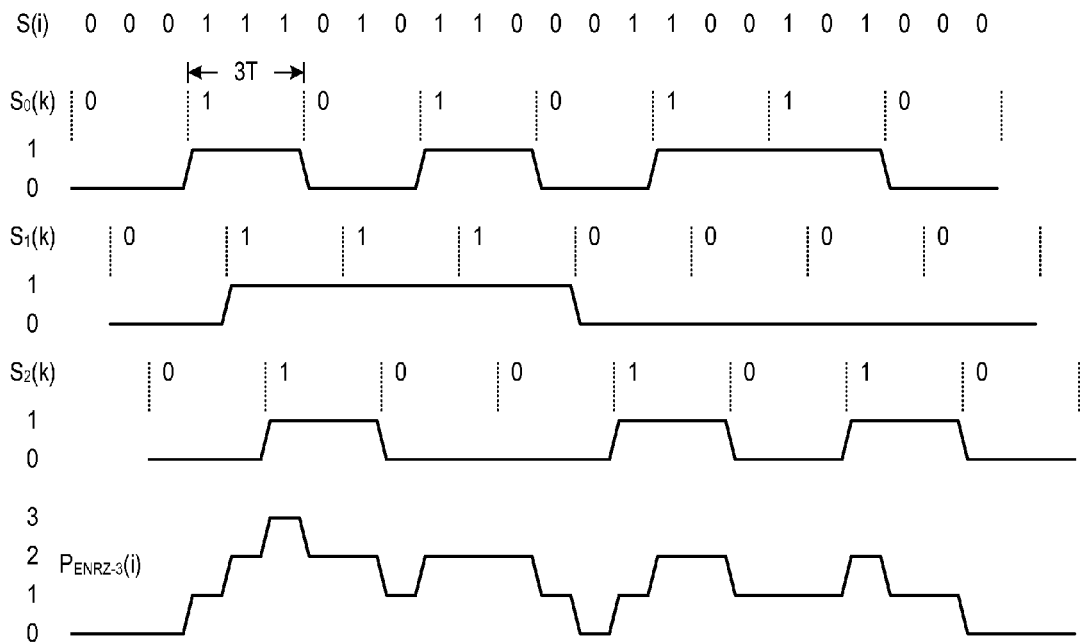
FIGS. 3A and 3B contain, respectively, a coding example and PSD plot for a first embodiment.

FIG. 3A shows, for the same exemplary bit sequence S(i) used to illustrate prior art NRZ, PAM4, and PAM8 signaling, formulation of ENRZ-3 signaling according to an embodiment. Three data sub-streams, $S_0(k)$, $S_1(k)$, and $S_2(k)$, are formed from bit sequence S(i). Although other mappings are possible (as long as the receiver knows the mapping used), in FIG. 3A the input bit sequence is partitioned such that input symbol S(3k+j) maps to sub-stream symbol $S_j(k)$. Thus $S_0(k)$, for example, receives the first bit, fourth bit, seventh bit, etc. of S(i).

Each data sub-stream translates to a corresponding NRZ signal, with period 3T (the period of S(i) is T). Due to the partitioning of bits among the sub-streams, transitions on $S_1(k)$ occur T seconds after transitions on $S_0(k)$, and transitions on $S_2(k)$ occur T seconds after transitions on $S_1(k)$.

To create an ENRZ-3 signal $P_{ENRZ-3}(i)$, the individual NRZ signals corresponding to $S_0(k)$, $S_1(k)$, and $S_2(k)$ are summed. The resulting signal takes values 0, 1, 2, and 3, depending on whether 0, 1, 2, or 3 of the sub-streams are transmitting a 1 at that instant. Each of these values corresponds to a transmitted signal level. Because only one of the sub-streams changes levels at any instant, $P_{ENRZ-3}(i)$ steps smoothly in one-level increments, as compared to PAM4, which has no such constraint.

Figure 1A:
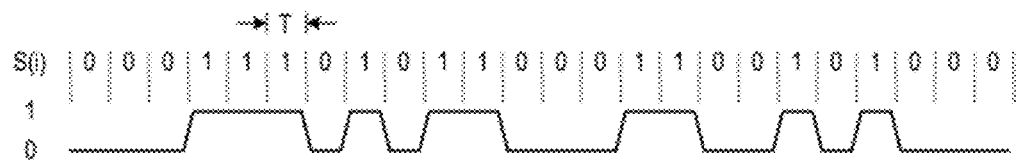
FIGS. 1A-1C show, respectively, channel coding examples for binary NRZ, PAM4, and PAM8 coding.
Figure 1B:
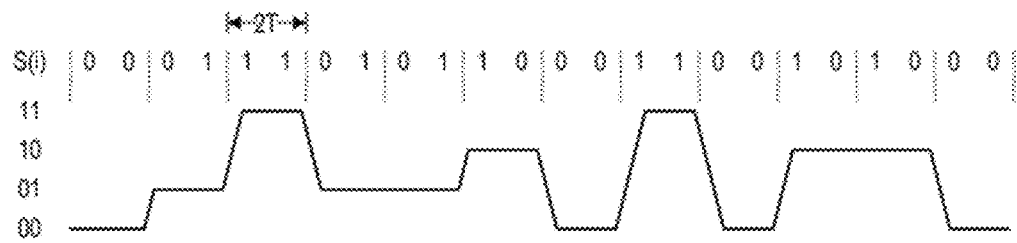
Figure 1C:
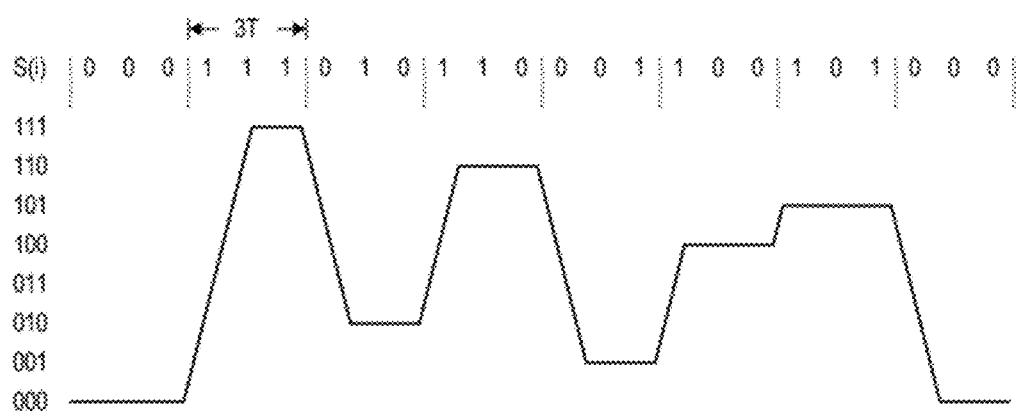
Figure 2:
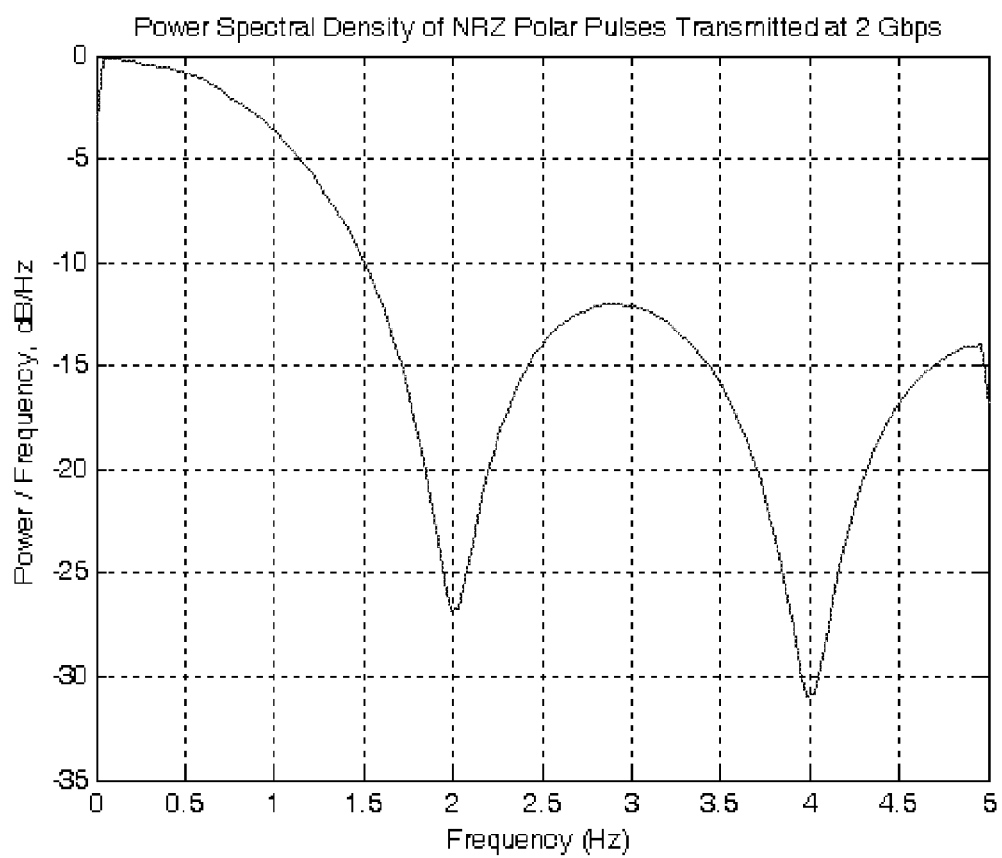
FIG. 2 contains a power spectral density (PSD) plot for NRZ polar signaling at 2 Gbps.
Figure 3B:
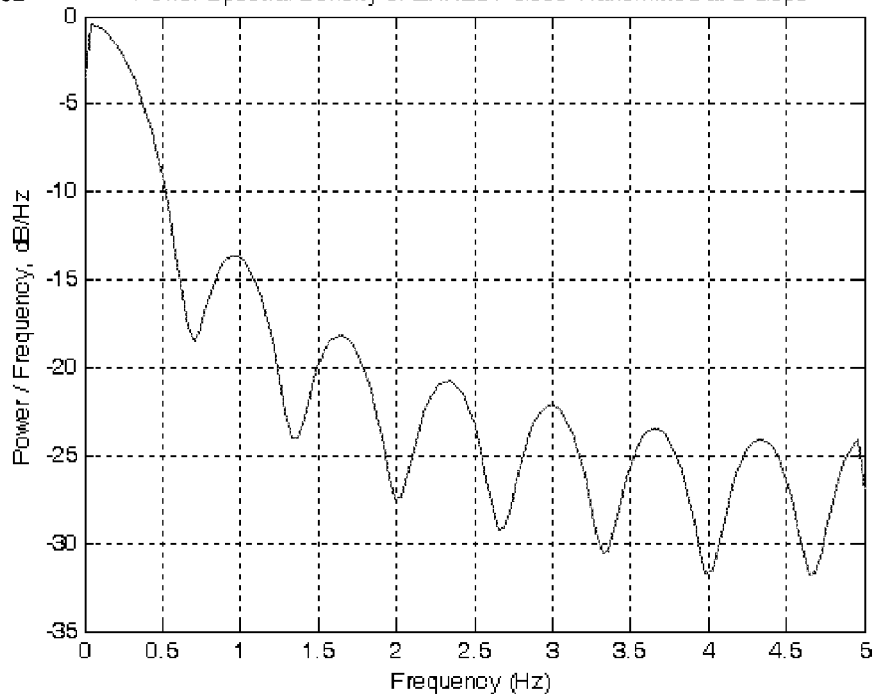

FIG. 3B shows a measured PSD function for an ENRZ-3 signal generated from a 10,000 bit binary sequence transmitted at 2 Gbps. The main lobe width is 0.67 GHz, and the signal energy envelope is down 13 dB by 1 GHz and down over 22 dB by 3 GHz, as compared to the polar NRZ PSD of FIG. 2, with a main lobe that extends to 2 GHz and a signal energy envelope that is down only 12 dB at 3 GHz.

Figure 4A:
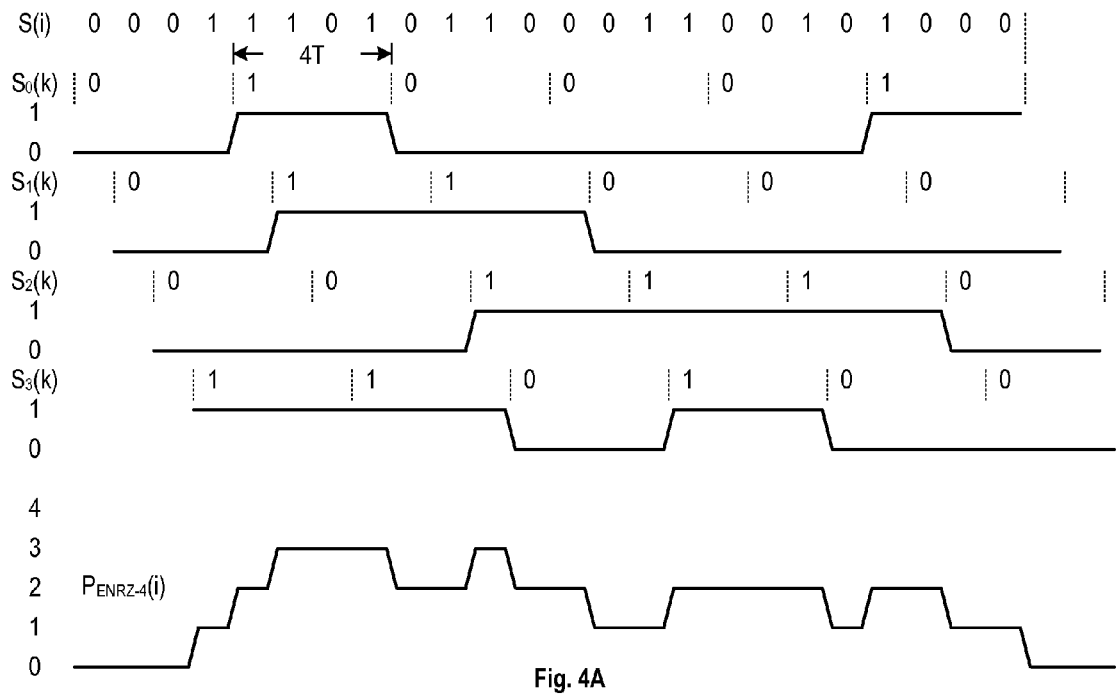
FIGS. 4A and 4B contain, respectively, a coding example and PSD plot for a second embodiment.

FIG. 4A shows, for the same exemplary bit sequence S(i) used in prior examples, formulation of ENRZ-4 signaling. Four data sub-streams, $S_0(k)$, $S_1(k)$, $S_2(k)$, and $S_3(k)$ are formed from bit sequence S(i). Although other mappings are possible (as long as the receiver knows the mapping used), in FIG. 4A the input bit sequence is partitioned such that input symbol S(4k+j) maps to sub-stream symbol $S_j(k)$. Thus $S_0(k)$, for example, receives the first bit, fifth bit, ninth bit, etc. of S(i).

Each data sub-stream translates to a corresponding NRZ signal, with period 4T (the period of S(i) is T). Due to the partitioning of bits among the sub-streams, transitions on $S_1(k)$ occur T seconds after transitions on $S_0(k)$, transitions on $S_2(k)$ occur T seconds after transitions on $S_1(k)$, and transitions on $S_3(k)$ occur T seconds after transitions on $S_2(k)$.

To create an ENRZ-4 signal $P_{ENRZ-4}(i)$, the individual NRZ signals corresponding to $S_0(k)$, $S_1(k)$, $S_2(k)$, and $S_3(k)$ are summed. The resulting signal takes values 0, 1, 2, 3, and 4, depending on whether 0, 1, 2, 3, or 4 of the sub-streams are transmitting a 1 at that instant. Because only one of the sub-streams changes levels at any instant, $P_{ENRZ-4}(i)$ steps smoothly in one-level increments.

Figure 4B:
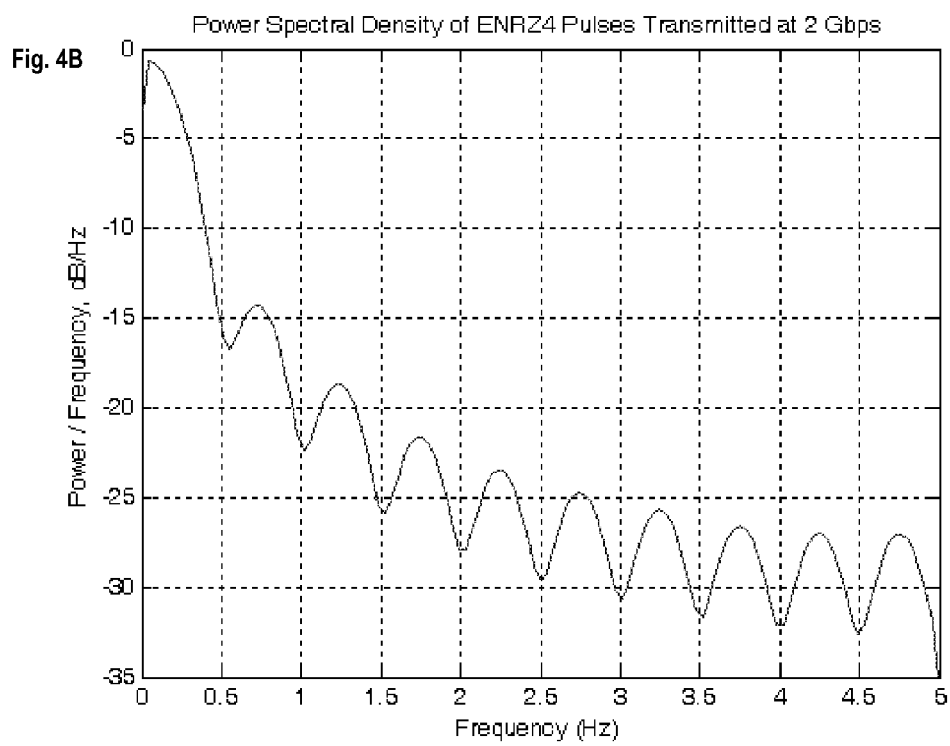

FIG. 4B shows a measured PSD function for an ENRZ-4 signal generated from a 10,000 bit binary sequence. The main lobe width is 0.5 GHz, and the signal energy envelope is down over 17 dB by 1 GHz and down over 25 dB by 3 GHz, as compared to the polar NRZ PSD of FIG. 2, with a main lobe that extends to 2 GHz and a signal energy envelope that is down only 12 dB at 3 GHz.

ENRZ-N signals for values of N other than 3 and 4 can be constructed using the same principles illustrated in the examples above.

Figure 5:
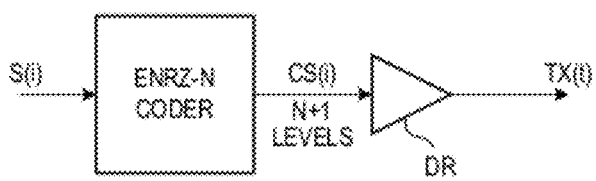
FIG. 5 contains a general block diagram for a serial channel transmitter according to an embodiment.

FIG. 5 illustrates the general form of an ENRZ-N transmitter for a binary-coded input data stream S(i). An ENRZ-N coder calculates, from S(i), a coded data stream CS(i) with N+1 levels. A driver translates the N+1-level coded data stream CS(i) to an analog waveform TX(t), e.g., of the type shown in FIGS. 3A and 4A. FIGS. 6A, 7, 8, and 9 illustrate several detailed embodiments for such a transmitter.

Figure 6A:
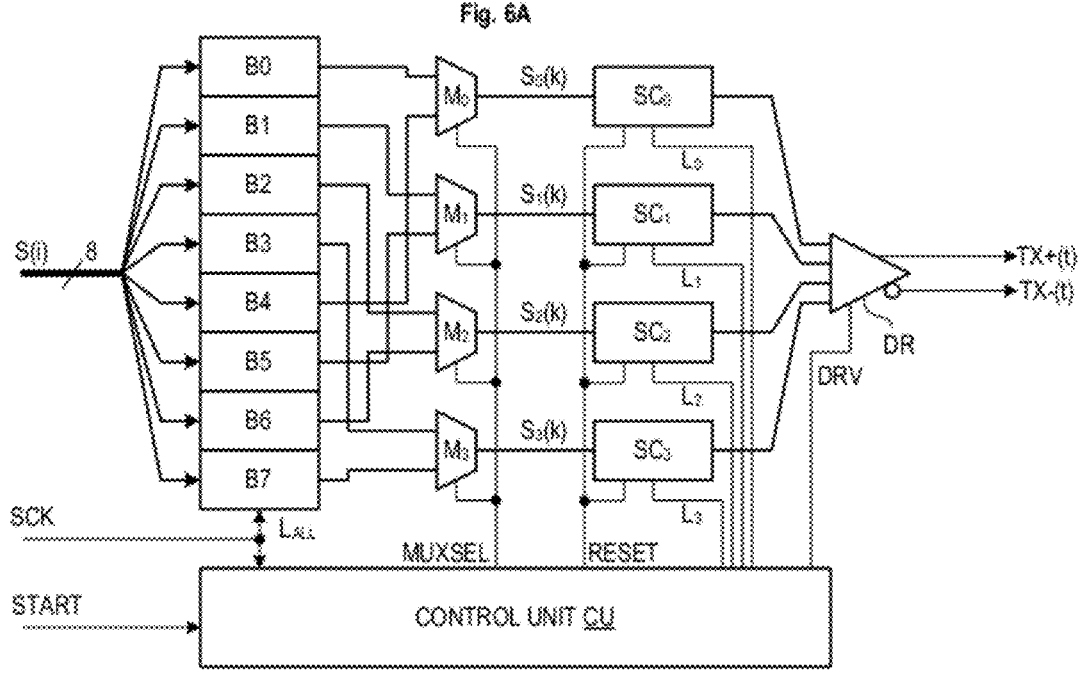
FIGS. 6A and 6B depict, respectively, a detailed block diagram for a serial channel transmitter embodiment and a timing diagram for the transmitter control signals.

FIG. 6A shows a first detailed transmitter embodiment, where the ENRZ-N coder is an ENRZ-4 coder comprising eight buffer registers B0-B7, four sub-multiplexers $M_0$-$M_3$, four sub-channel registers $SC_0$-$SC_3$, and a control unit CU. The inputs comprise an eight-bit parallel input data stream S(i), an input stream clock SCK, and a START signal. The eight buffer registers B0-B7 receive the bits of the parallel input data stream. The outputs of buffer registers B0 to B3 connect respectively to the 0 inputs of sub-multiplexers $M_0$-$M_3$. The outputs of buffer registers B4 to B7 connect respectively to the 1 inputs of sub-multiplexers $M_0$-$M_3$. A control line MUXSEL from control unit CU determines whether the 0 inputs or 1 inputs are output from the sub-multiplexers.

The outputs of the sub-multiplexers $M_0$-$M_3$ are, respectively, the data sub-streams $S_0(k)$-$S_3(k)$, and are supplied respectively as inputs to the four sub-channel registers $SC_0$-$SC_3$. Each sub-channel register $SC_j$ loads a data sub-stream value upon receiving a load signal $L_j$ from control unit CU. Each sub-channel register also receives a RESET signal from control unit CU that causes all registers to load a zero value, e.g., upon the receipt of a START signal.

The outputs of the four sub-channel registers are supplied to a differential driver DR. Driver DR reads the codes output by the four sub-channel registers each time it receives a clock signal DRV. Differential driver DR interprets the codes output by the sub-channel registers, e.g., by adding them or using them as an address into a look-up table that instructs driver DR which of its five levels to drive. One of the five levels is driven on an output TX+(t) and its logical inverse is driven on an output TX−(t).

Figure 6B:
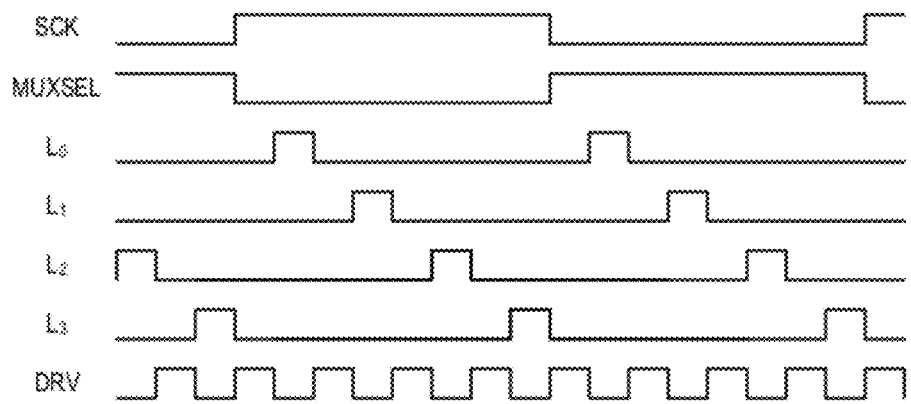

FIG. 6B shows exemplary timing for the control signals of the FIG. 6A transmitter. Each time SCK goes high, a new set of eight symbols from S(i) is latched into B0-B7. The MUXSEL signal is taken low at this time to select the contents of B0-B3 for supply to the sub-channel registers. An internal clock within CU runs at eight times the input clock SCK, and also functions as the DRV signal. On the first falling edge of DRV after SCK goes high, control unit CU strobes $L_0$, causing $SC_0$ to load a new value. On the second falling edge of DRV after SCK goes high, control unit CU strobes $L_1$, causing $SC_1$ to load a new value. This pattern continues for $SC_2$ and $SC_3$ on the next two falling edges of DRV, and then MUXSEL is driven high to select the contents of B4-B7 for supply to the sub-channel registers. The load sequence is repeated for the four sub-channel registers, after which a new set of eight S(i) symbols is latched into B0-B7, and the sequence repeats.

Figure 7:
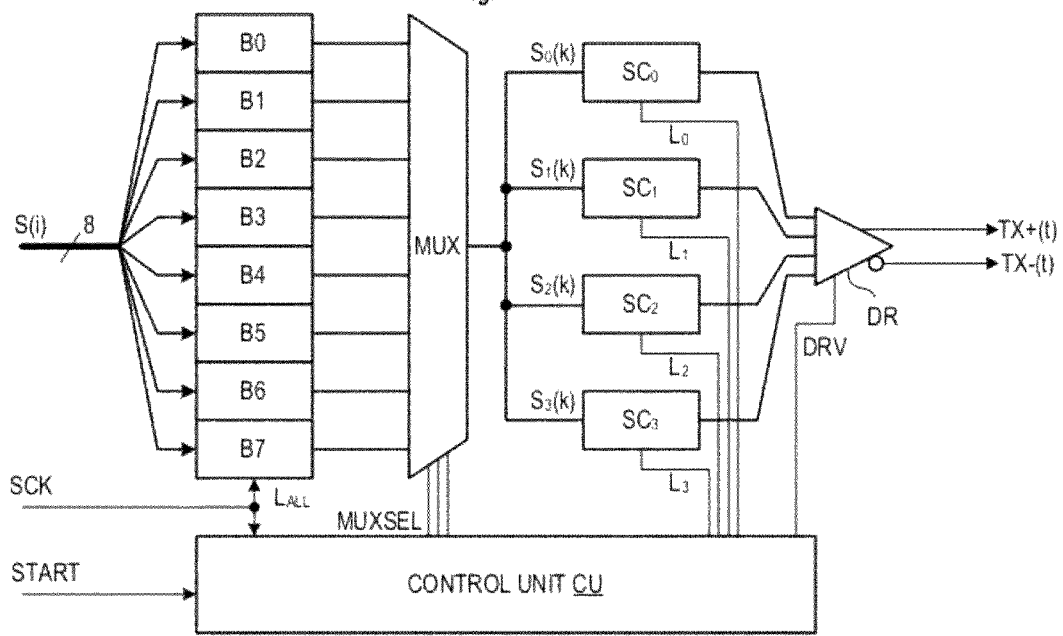
FIGS. 7-9 depict other serial channel transmitter embodiments.

FIG. 7 shows a variation of the FIG. 6 embodiment. Instead of four sub-multiplexers, a single 8-input MUX receives all eight outputs of registers B0-B7. Three MUXSEL lines allow control unit CU to select each register output individually. The single MUX output supplies the data sub-streams to all sub-channel registers, but the separate latch inputs determine which sub-channel registers actually latch the MUX output. This embodiment allows the coder to be initialized such that all four sub-channel registers begin transmitting the first symbol in the data sequence after a START signal is received. The FIG. 7 embodiment can also run as an ENRZ-3 coder, by disabling one of the sub-channel registers (e.g., making its output 0 and then never pulsing its latch signal) and distributing bits from the registers B0-B7 to the remaining three sub-channel registers in round-robin fashion.

Figure 8:
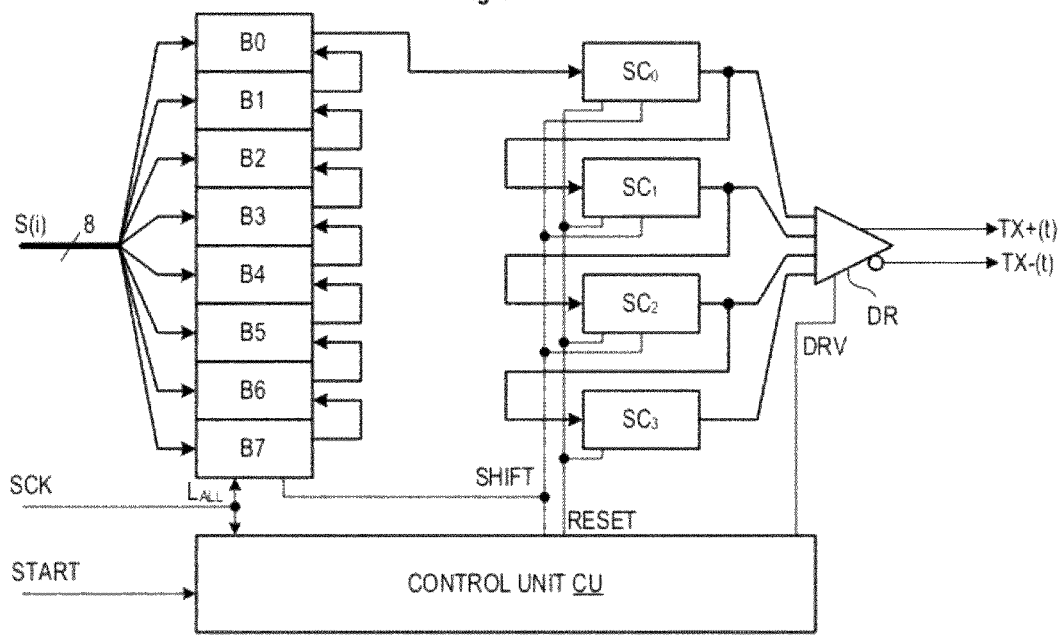

FIG. 8 illustrates yet another transmitter embodiment. In FIG. 8, registers B0-B7 are configured as load-shift registers. When SCK transitions high, all registers load a bit from the parallel signal S(i). A SHIFT signal from control unit CU, synchronized but out of phase with DRV, causes the contents of each register Bj to shift to register Bj−1. The SHIFT signal also causes the contents of register B0 to shift to sub-channel register $SC_0$, the contents of register $SC_0$ to shift to register $SC_1$, etc. Although the symbols do not remain resident in the same sub-channel register for four DRV cycles, like in the prior embodiments, each symbol remains resident in the sub-channel registers as a whole for four DRV cycles before shifting out of $SC_3$. Thus the shift process is mathematically equivalent to the staggered distribution technique of FIGS. 6A and 7.

Figure 9:
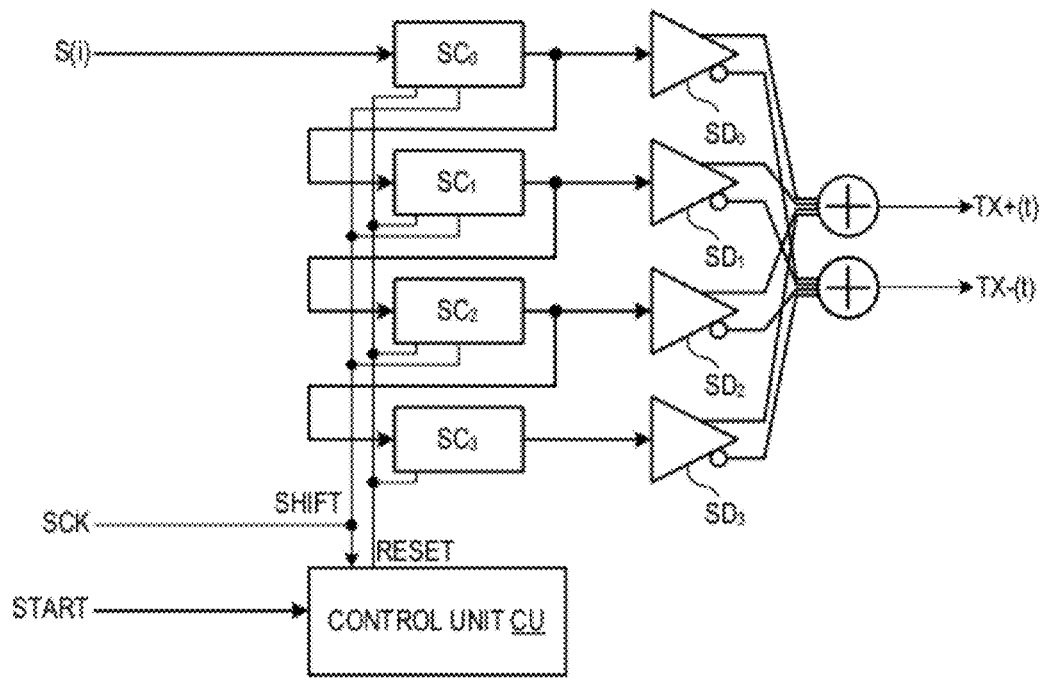

FIG. 9 illustrates a transmitter embodiment similar to FIG. 8, but simplified for a serial input stream S(i). In this embodiment, S(i) feeds directly into $SC_0$ and is shifted through the remaining sub-channel registers.

FIG. 9 also illustrates the use of separate NRZ drivers $SD_0$-$SD_3$ for each sub-channel register, respectively. An adder function (which can comprise diodes, resistive networks, DC blocking capacitors, etc.) combines the signals from the four NRZ drivers directly to produce the transmitted signal.

Figure 10:
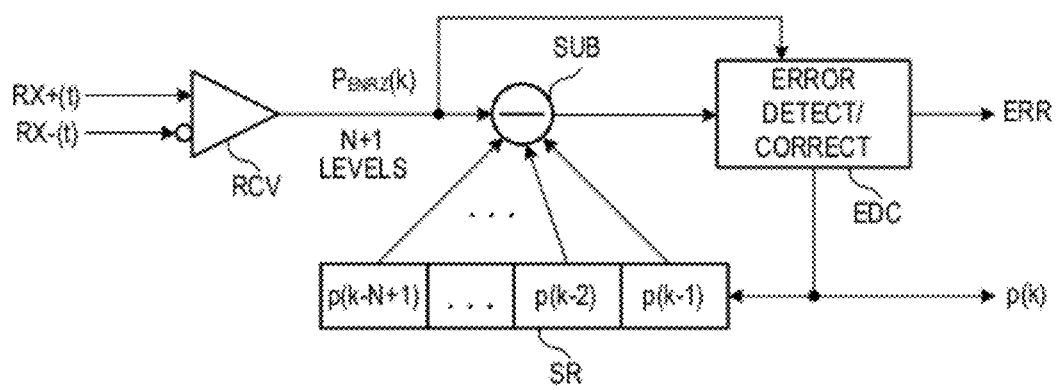
FIGS. 10-12 contain block diagrams for serial channel receiver embodiments.

FIG. 10 contains a block diagram for a simple ENRZ-N decoder comprising a differential receiver RCV, a subtraction circuit SUB, a shift register SR, and an optional error detection/correction circuit EDC. The receiver receives a differential signal RX+(t), RX−(t) on a differential pair. The receiver recovers the signal timing from the differential signal. The receiver then determines, e.g., by sampling at an appropriate point in each symbol interval, which one of N+1 levels was sent by the transmitter. The sensed level is provided as a coded sample $P_{ENRZ}(k)$ to the subtraction circuit SUB and the error detection/correction circuit EDC.

The coded sample $P_{ENRZ}(k)$ is a sum of overlapping pulses p(k) representing the last N sub-channel pulses:

$$P_{ENRZ}(k) = \sum_{i=0}^{N-1} p(k-i) \tag{1}$$

Given that all prior sub-channel pulses have already been decoded, the current sub-channel pulse can be determined from the current coded sample by rearranging equation 1:

$$p(k) = P_{ENRZ}(k) - \sum_{i=1}^{N-1} p(k-i) \tag{2}$$

In FIG. 10, prior decoded sub-channel pulses are supplied to a shift register SR, which, in conjunction with SUB, implements equation 2.

A further substitution of equation 1, for coded sample $P_{ENRZ}(k-1)$, shows the relationship between one coded sample and the next:

$$P_{ENRZ}(k) = P_{ENRZ}(k-1) + p(k) - p(k-N) \tag{3}$$

In equation 3, it is evident that only two sub-channel pulses contribute to the difference between one coded sample and the next (the two sub-channel pulses belong to the same sub-channel and are N samples apart in the original data sequence). Thus, from equation 3, if p(k−N) was decoded as a 0, $$P_{ENRZ}(k) = P_{ENRZ}(k-1) + p(k) \tag{4}$$

$P_{ENRZ}(k)$ can only take two values given equation 4. If p(k)=0, $P_{ENRZ}(k)=P_{ENRZ}(k-1)$. If p(k)=1, $P_{ENRZ}(k)=P_{ENRZ}(k-1)+1$. Any other value received for $P_{ENRZ}(k)$ indicates that an error has occurred. Likewise from equation 3, if p(k−N) was decoded as a 1, $$P_{ENRZ}(k) = P_{ENRZ}(k-1) + p(k) - 1 \tag{5}$$

Again, $P_{ENRZ}(k)$ can only take two values given equation 5. If p(k)=0, $P_{ENRZ}(k)=P_{ENRZ}(k-1)-1$. If p(k)=1, $P_{ENRZ}(k)=P_{ENRZ}(k-1)$. Any other value received for $P_{ENRZ}(k)$ indicates that an error has occurred.

Based on these observations, error detect/correct circuit EDC can detect some errors in the coded sample stream. First, whether the decoded sub-channel pulses are correct or not, the following must be true for two valid coded samples:

$$|P_{ENRZ}(k) - P_{ENRZ}(k-1)| < 1.5\Delta \tag{6}$$

where $\Delta$ is the spacing between neighboring ones of the N signal levels. Second, based on equations 4 and 5, EDC can use comparisons based on the value of p(k−N) to further limit the allowable range of $P_{ENRZ}(k)$:

$$p(k-N) = \begin{cases} 0 & -0.5 < P_{ENRZ}(k) - P_{ENRZ}(k-1) < 1.5\Delta \\ 1 & -1.5\Delta < P_{ENRZ}(k) - P_{ENRZ}(k-1) < 0.5\Delta \end{cases} \quad (7)$$

When $P_{ENRZ}(k)$ exceeds the allowable range, error detect/correct circuit EDC can assert a signal ERR. Optionally, EDC can attempt to correct such an error by clipping an out-of-range value to be in-range. This can correct some errors, but assumes that an undetected error did not occur on a preceding sample.

Figure 11:
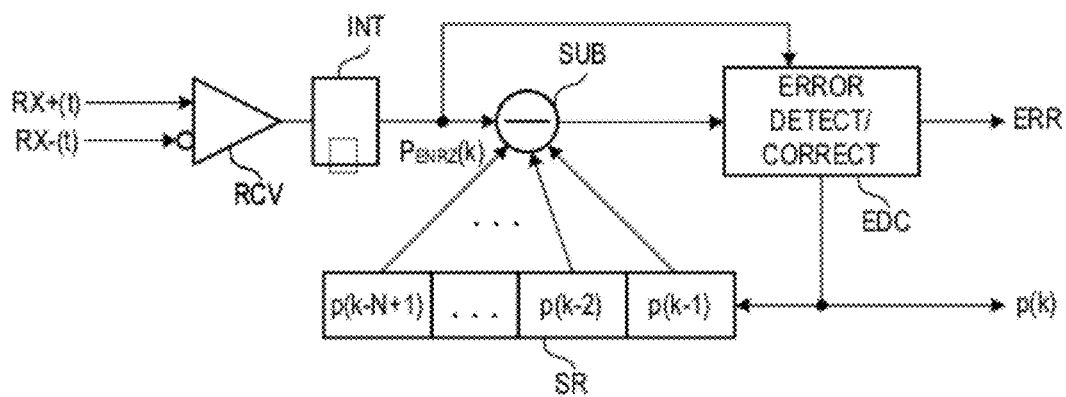

FIG. 11 shows an alternate receiver embodiment that includes an integrator INT. Instead of sampling a voltage, e.g., at a sample midpoint, the integrator averages the voltage over a sample interval to arrive at a decoded sample value $P_{ENRZ}(k)$. This has the effect of averaging white noise, which can improve detection performance. The remainder of the receiver functions as described above.

Figure 12:
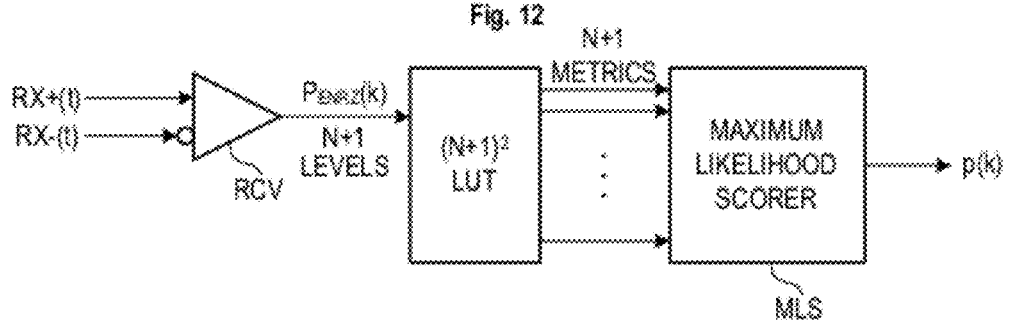

FIG. 12 shows an alternate embodiment that takes a more complex approach to decoding. Each sub-channel pulse actually appears in N successive coded samples. Rather than decoding a sub-channel pulse from the first coded sample that contains it, all coded samples containing a contribution from the sub-channel pulse can be used to determine the value of a sub-channel pulse. Expanding on equation 1 for N consecutive samples, $$\sum_{j=0}^{N-1} P_{ENRZ}(k+j) = \sum_{j=0}^{N-1}\sum_{i=0}^{N-1} p(k-i+j) \quad (8)$$
$$= Np(k) + \sum_{i=1}^{N-1}(N-i)p(k-i) + \sum_{i=1}^{N-1}(N-i)p(k+i)$$

FIG. 12 makes use of equation 8 to arrive at a value for p(k) based on some number of coded samples $P_{ENRZ}(k)$. When a new $P_{ENRZ}(k)$ sample arrives, the sample indexes N+1 metrics in a lookup table LUT. Each metric expresses the magnitude of the error that would have to occur for a given group/of sub-channel pulse sequences to produce the received value $P_{ENRZ}(k)$. For instance, if N=3 and $P_{ENRZ}(k)=3$, the distance metric for the sub-channel pulse sequence 111 is 0, the distance metric for the sub-channel pulse sequences 110, 101, and 011 is 1, the distance metric for the sub-channel pulse sequences 001, 010, and 100 is 2, and the distance metric for the sub-channel pulse sequence 000 is 3. In other words, it is most likely that $P_{ENRZ}(k)$ represents 111, but it could represent other sequences with added noise, although it is extremely unlikely that 000 was the sub-channel pulse sequence.

In FIG. 12, a maximum likelihood scorer MLS receives the metrics. By summing metrics for different extended potential sub-channel pulse sequences, MLS can determine a potential sequence with the highest likelihood (lowest summed metric), and use the summed metrics to select a symbol p(k) some number of $P_{ENRZ}$ samples after $P_{ENRZ}(k)$. The selected symbol p(k) can then be fed back to prune the possible pulse sequences for p(k+1), which will be selected next.

Although the prior examples code each data sub-stream using a binary coding, it is possible to pre-code the input data stream to achieve other effects. FIG. 13 shows one example, where an input data stream S(i) is pre-coded to a ternary sequence PK(i). PK(i) copies all "0" samples from S(i) directly. The first N "1" samples are counted and copied, and then the next N "1" samples are counted but copied to PK(i) as "−1" values. FIG. 13 represents an ENRZ-3 coding example, and thus PK(i) alternates "1" and "−1" values in groups of three. Ternary subchannels $S_0(k)$, $S_1(k)$, and $S_2(k)$ are also shown for conceptualization of the frequency content in each subchannel.

The value $P_{ENRZ-3}(i)$ is now computed as a running sum of PK(i). At every sample, $P_{ENRZ-3}(i)$ either holds or steps up one level, until the maximum level is reached. $P_{ENRZ-3}(i)$ then either holds or steps down one level, until the minimum level is reached. This behavior then repeats. The resulting waveform uses the full range of N+1 levels.

The $P_{ENRZ-3}(i)$ values based on this pre-coding are decoded at the receiver as follows. When $P_{ENRZ-3}(i)=P_{ENRZ-3}(i-1)$, p(i) is a 0. When $P_{ENRZ-3}(i) \neq P_{ENRZ-3}(i-1)$, p(i) is a 1. Errors cannot propagate with this pre-coding. Errors can be detected when the sample sequence reverses from stepping one direction to stepping the other without reaching an end level first.

Those skilled in the art will appreciate that the embodiments and/or various features of the embodiments can be combined in other ways than those described. The ENRZ-N transmitted levels can be selected to be polar or not, and can be transmitted differentially or not. A given embodiment can be used with different values of N at different times. Between message sequences, a preset synchronization sequence can be transmitted on the serial channel. The preset synchronization sequence need not follow ENRZ-N conventions.

Although the specification may refer to "an", "one", "another", or "some" embodiment(s) in several locations, this does not necessarily mean that each such reference is to the same embodiment(s), or that the feature only applies to a single embodiment.

What is claimed is:

1. A method of transmitting a data stream S(i) across an electrical serial channel at a first rate of R symbols/sec, the method comprising:
    coding the data stream S(i) using a coder to create a coded data stream CS(i) having N+1 logic levels, N>2, such that the coded data stream value CS(i+1) changes by at most one logic level from the logic level of CS(i); and
    transmitting the coded data stream CS(i) using a driver that receives signal values corresponding to the N+1 logic levels;
    wherein S(i) is a binary sequence, wherein coding the data stream S(i) to create the coded data stream CS(i) comprises pre-coding S(i) to produce a pre-coded data stream that is a ternary sequence, the precodinq comprising mapping N occurrences of the value "1" to a value "1" and then mapping the next N occurrences of the value "1" to a value "−1" in alternating fashion, and mapping all symbols having a value "0" to a value "0," and performing a modified exclusive-OR operation that changes CS(i+1) by one logic level from CS(i) when the next pre-coded data symbol is either a "1" or a "−1," with the direction of the level change determined by the sign of the "1".

2. The method of claim 1, wherein in the coded data stream CS(i+N)=CS(i+N−1) when S(i)=S(i+N).

3. The method of claim 1, wherein in the coded data stream CS(i+N)=CS(i+N−1)+1 when S(i)<S(i+N), and CS(i+N)=CS(i+N−1)−1 when S(i)>S(i+N).

4. A serial channel transmitter comprising:

a coder, the coder coding a data stream S(i) to produce a coded data stream CS(i) having N+1 logic levels, N>2, such that the coded data stream value CS(i+1) changes by at most one logic level from the logic level of CS(i), wherein the coder comprises N sub-coders $SC_j$, $0 \leq j < N$, and wherein when sub-coder $SC_0$ codes S(i), sub-coder $SC_j$ codes S(i−j); and a driver to transmit the coded data stream CS(i) using signal values corresponding to the N+1 logic levels, wherein the driver comprises N sub-drivers $SD_j$, $0 \leq j < N$, each sub-driver $SD_j$ transmitting a signal value corresponding to the output of sub-coder $SC_j$, the driver summing the outputs of the sub-drivers.

5. The transmitter of claim 4, wherein the coder produces a value CS(i+N)=CS(i+N−1) when S(i)=S(i+N), a value CS(i+N)=CS(i+N−1)+1 when S(i)<S(i+N), and CS(i+N)=CS(i+N−1)−1 when S(i)>S(i+N).

6. The transmitter of claim 4, wherein the sub-coders are chained together such that the input of sub-coder $SC_j$ is the output of sub-coder $SC_{j-1}$, for $0 < j < N$.

7. A serial channel transmitter comprising:

a coder, the coder coding a data stream S(i) to produce a coded data stream CS(i) having N+1 logic levels, N>2, such that the coded data stream value CS(i+1) changes by at most one logic level from the logic level of CS(i), wherein the coder comprises N sub-coders $SC_j$, $0 \leq j < N$, and wherein when sub-coder $SC_0$ codes S(i), sub-coder $SC_j$ codes S(i−j); and a driver to transmit the coded data stream CS(i) using signal values corresponding to the N+1 logic levels, wherein the sub-coders are each clocked at a rate equal to 1/N times the symbol rate R of data stream S(i), the serial channel transmitter further comprising a demultiplexer to distribute the symbols in data stream S(i) among the sub-coders.

8. The transmitter of claim 7, wherein the sub-coders are phased such that sub-coder $SC_j$ produces a new output value 1/R seconds after sub-coder $SC_{j-1}$ produces a new output value, for $0 < j < N$.

9. A serial channel transmitter comprising:

a coder, the coder coding a data stream S(i) to produce a coded data stream CS(i) having N+1 logic levels, N>2, such that the coded data stream value CS(i+1) changes by at most one logic level from the logic level of CS(i), wherein the coder comprises N sub-coders $SC_j$, $0 \leq j < N$, and wherein when sub-coder $SC_0$ codes S(i), sub-coder $SC_j$ codes S(i−j); and a driver to transmit the coded data stream CS(i) using signal values corresponding to the N+1 logic levels, wherein S(i) is a binary sequence, wherein coding the data stream S(i) to create the coded data stream CS(i) comprises pre-coding S(i) to produce a pre-coded data stream that is a ternary sequence, the precoding comprising mapping N occurrences of the value "1" to a value "1" and then mapping the next N occurrences of the value "1" to a value "−1" in alternating fashion, and mapping all symbols having a value "0" to a value "0," and performing a modified exclusive-OR operation that changes CS(i+1) by one logic level from CS(i) when the next pre-coded data symbol is either a "1" or a "−1," with the direction of the level change determined by the sign of the "1."

* * * * *